(12) United States Patent
Chen et al.

(10) Patent No.: US 9,280,178 B2
(45) Date of Patent: Mar. 8, 2016

(54) PORTABLE ELECTRONIC APPARATUS AND EXPANDING PLATFORM THEREOF

(71) Applicant: Wistron Corporation, New Taipei (TW)

(72) Inventors: Hung-Chih Chen, New Taipei (TW); Chen-Yi Liang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 55 days.

(21) Appl. No.: 14/458,720

(22) Filed: Aug. 13, 2014

(65) Prior Publication Data

US 2015/0146369 A1 May 28, 2015

(30) Foreign Application Priority Data

Nov. 26, 2013 (TW) .............................. 102142907 A

(51) Int. Cl.
*G06F 1/16* (2006.01)

(52) U.S. Cl.
CPC ............ *G06F 1/1613* (2013.01); *G06F 1/1616* (2013.01); *G06F 1/1669* (2013.01)

(58) Field of Classification Search
USPC ........... 345/175, 173, 174, 179, 88, 690, 211, 345/102, 204, 633, 156, 672, 501, 590; 351/159, 68; 361/679.55, 679.01, 361/679.02, 679.22, 679.21, 679.33, 361/679.27, 679.26, 679.3, 679.31, 679.09; 312/223.1, 296, 7.2, 294, 223.6, 34.12, 312/247, 213, 223.3, 249; 349/42, 65, 70, 349/62, 15, 58, 96, 60, 63, 98, 187; 362/311.02, 97.1, 97.2, 621, 19, 633, 362/612, 613, 611, 617, 625, 627, 373
See application file for complete search history.

(56) References Cited

U.S. PATENT DOCUMENTS

| | | | |
|---|---|---|---|
| 2010/0220050 A1* | 9/2010 | Kishimoto | G02F 1/133608 345/102 |
| 2014/0056028 A1* | 2/2014 | Nichol | G02B 6/0028 362/611 |

* cited by examiner

*Primary Examiner* — Hung Duong
(74) *Attorney, Agent, or Firm* — Muncy, Geissler, Olds & Lowe, P.C.

(57) ABSTRACT

An expanding platform for a portable electronic apparatus is disclosed. The expanding platform includes a base, a moving element, an elastic element and a magnetic element. The moving element and the magnetic element are respectively and movably combined with the base. When the moving element is at an initial position, the moving element limits the movement of the magnetic element by a blocking portion. When the moving element moves to an unlocking position with respect to the base, the magnetic element disengages from the blocking portion and is attracted to move by a corresponding magnetic element of a main device combined with the base, so that the moving element is fixed at the unlocking position by the magnetic element blocking the blocking portion. After the magnetic element returns to its original position, the moving element returns to the initial position by the elastic element.

21 Claims, 6 Drawing Sheets

PORTABLE ELECTRONIC APPARATUS AND EXPANDING PLATFORM THEREOF

BACKGROUND OF THE DISCLOSURE

1. Field of the Disclosure

The present disclosure relates to an expanding platform, and more particularly, it relates to an expanding platform used in a portable electronic apparatus for a user to operate with one hand. The present disclosure also discloses a portable electronic apparatus using the expanding platform.

2. Description of the Related Art

In recent years portable devices such as tablet PCs are gaining popularity among many users. Compared with notebook PCs, tablet PCs are more convenient in terms of portability; and they support touch inputs to offer more intuitive operations. However, tablet PCs are not equipped with physical keyboards, making it inconvenient for users who are accustomed to typing with keyboards. Therefore, there are expanding platforms disposed with keyboards and made for tablet PCs emerging in the market; besides, there are also separable notebook PCs which can let users use only the tablet portion and combine the tablet portion with the expanding platform to restore the notebook configuration when necessary.

When a user wants to combine a tablet PC with its expanding platform, he or she can use only one hand to insert the tablet PC into the expanding platform to enable electrical connection; on the other hand, when the user wants to separate the tablet PC and the expanding platform, he or she has to use one hand to operate an unlocking element or to hold the expanding platform, and then uses another hand to apply a force on the tablet PC to disengage the tablet PC from the expanding platform. It is inconvenient for the user since the above operating procedure is complicated.

Therefore, it is necessary to provide an expanding platform which can let the user to combine the tablet PC with its expanding platform or to separate them with only one hand, making it easy-to-use and convenient for the user.

SUMMARY OF THE DISCLOSURE

It is an object of the present disclosure to provide an expanding platform for a user to operate with one hand.

In order to achieve the above object, the present disclosure discloses an expanding platform comprising a base, a moving element, an elastic element, and a magnetic element. The moving element is movably combined with the base to move between an initial position and an unlocking position along a first axial direction with respect to the base. The moving element comprises a blocking portion. The elastic element comprises two ends connected with the base and the moving element respectively. The magnetic element is movably combined with the base to move with respect to the base between a first position and a second position along a second axial direction substantially perpendicular to the first axial direction. Wherein the moving element at the initial position limits the magnetic element to the first position by the blocking portion. When the moving element moves to the unlocking position, the magnetic element disengages from the blocking portion and is attracted to move to the second position by a corresponding magnetic element of the main device combined with the base, so that the moving element is fixed at the unlocking position by the magnetic element blocking the blocking portion. After the magnetic element returns to the first position, the moving element returns to the initial position by the elastic force of the elastic element.

It is another object of the present to provide a portable electronic apparatus, which comprises a main device and the expanding platform as described above. The main device is detachably combined with the expanding platform. The main device comprises a corresponding magnetic element disposed with respect to the magnetic element. When the main device is combined with the expanding platform, the corresponding magnetic element generates a magnetic effect with the magnetic element.

Accordingly, the present disclosure provides an expanding platform which can be fixed with the main device simply by directly connecting the expanding platform with the main device. Then, the user can use only one hand to combine the main device with the expanding platform or to disengaging the main device from the expanding platform, thereby enhancing convenience in using the expanding platform.

DETAILED DESCRIPTION OF THE PREFERRED EMBODIMENT

The advantages and innovative features of the disclosure will become more apparent from the following detailed description when taken in conjunction with the accompanying drawings.

Figure 1:
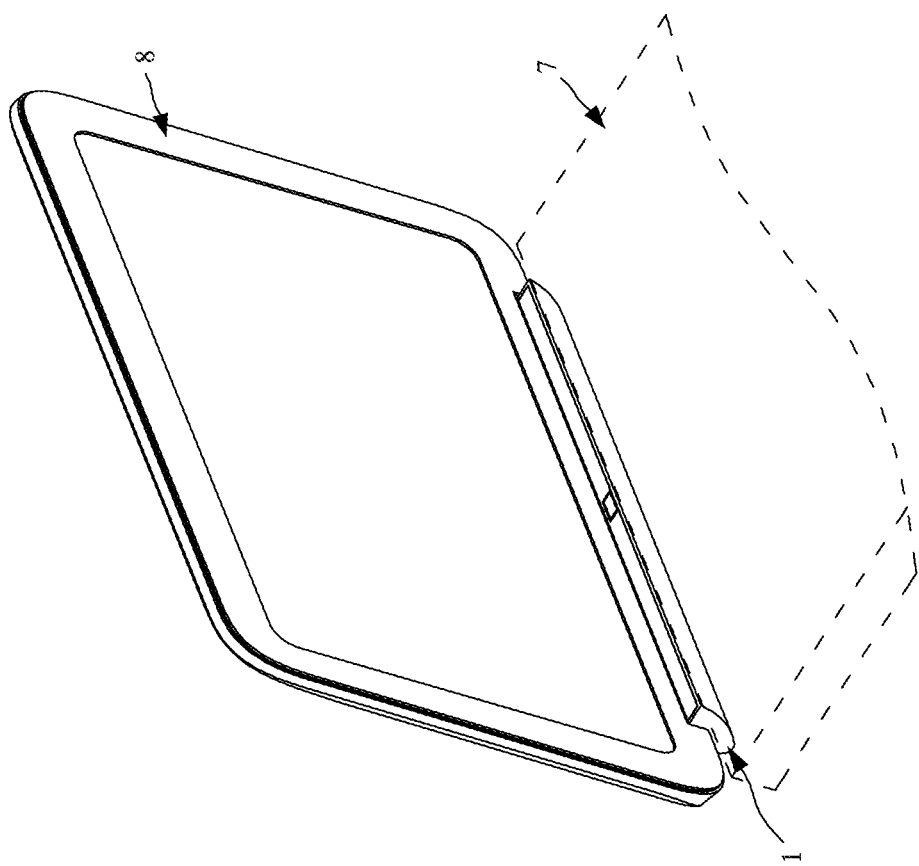
FIG. 1 illustrates an expanding platform combined with a main device in the present disclosure.

Please refer to FIG. 1 for an expanding platform 1 combined with a main device 8 in the present disclosure. As shown in FIG. 1, a main device 8 can be inserted into the expanding platform 1 to be combined with each other, wherein the main device 8 can be a tablet PC, a smart phone, a display panel of a separable notebook PC, or the like, etc. The expanding platform 1 can be electrically connected to the main device 8 via a connecting interface (not shown in figure, which can be USB or other data transmission interface). The connecting interface will not be further described since it is known in the art.

The expanding platform 1 can be combined with a functional module 7, such as an input device (such as a keyboard or touch panel) or another main device, and provide data transmission between the functional module 7 and the main device 8 via the connecting interface. In the following, in order to focus on the structural features of the present disclosure, the functional module 7 is omitted in the figures for the sake of brevity. Besides, the main device 8 is illustrated by a Tablet PC; however, the main device 8 can be any other similar devices.

Figure 2:
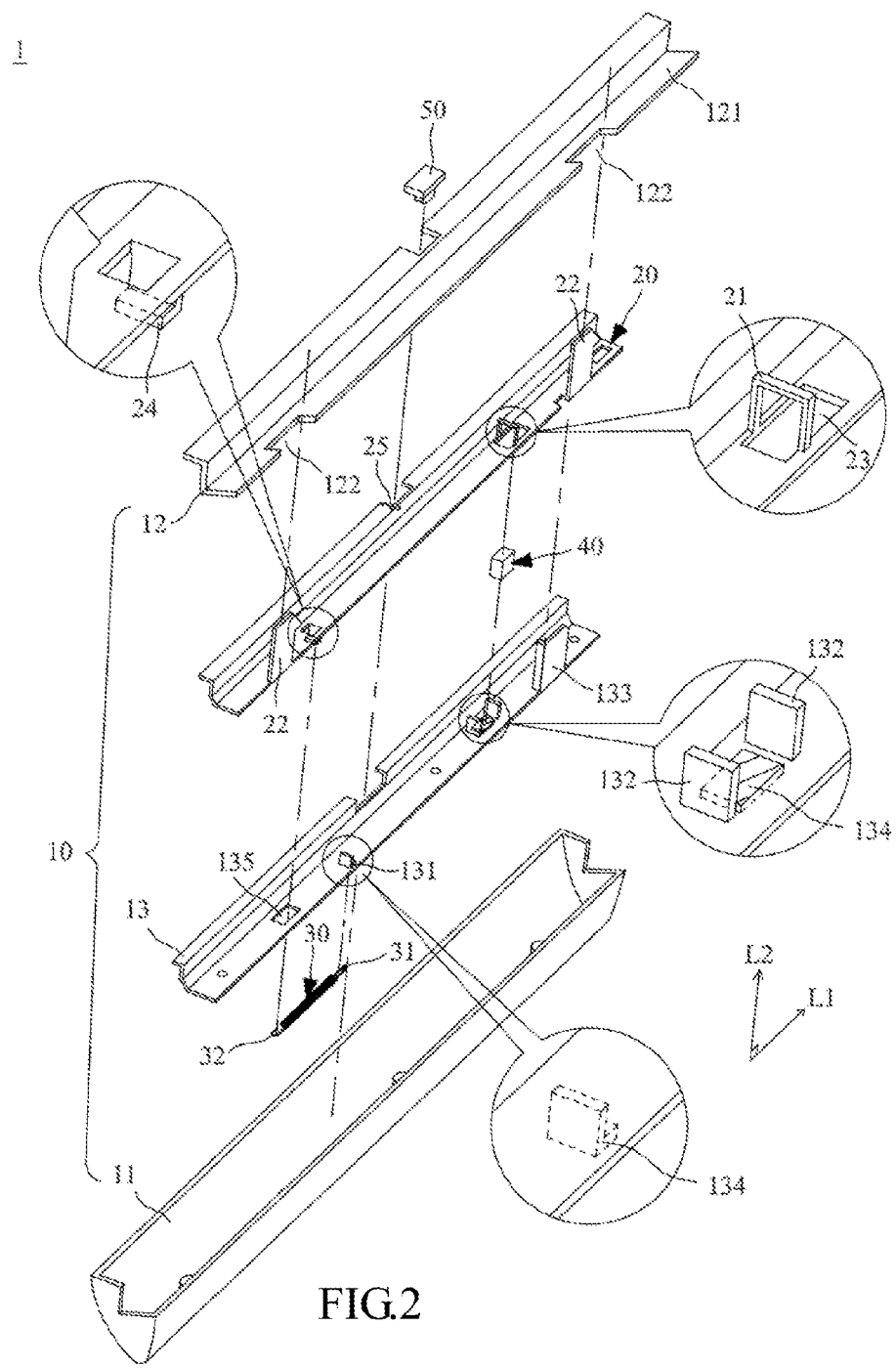
FIG. 2 illustrates an explosive view of the expanding platform of the present disclosure.

Please refer to FIG. 2 for an explosive view of the expanding platform 1 of the present disclosure. As shown in FIG. 2, the expanding platform 1 comprises a base 10, a moving element 20, an elastic element 30, and a magnetic element 40. In one embodiment of the present disclosure, the base 10 comprises a first housing 11, a second housing 12, and a holder 13, and the holder 13 is clamped between the first housing 11 and the second housing 12. The first housing 11 and the holder 13 can be integrated to form in one piece to reduce the number of assembly elements and the necessity of using locking elements. The second housing 12 forms a recess 121 for inserting the main device 8 (shown in FIG. 1) therein; besides, the connecting interface can also be disposed in the recess 121. The recess 121 is disposed with at least one opening 122.

The holder 13 comprises a first fixing portion 131, a limiting portion 132, and at least one auxiliary limiting portion 133. The first fixing portion 131 can be, for example, a hook structure for fixing the elastic element 30. The limiting portion 132 extends towards the second housing 12 to limit the magnetic element 40 to move in a certain direction. The at least one auxiliary limiting portion 133 goes through the opening 122 of the second housing 12 to protrude out of the recess 121 and is used for limiting a moving distance of the moving element 20. The holder 13 further comprises an auxiliary magnetic element 134, and the auxiliary magnetic element 134 is disposed at the limiting portion 132. The auxiliary magnetic element 134 can be a magnet or a metal element attracted to magnet (such as iron) for fixing the magnetic element 40 by an magnetic attraction force. The holder 13 further comprises a first through hole 135.

The moving element 20 is movably combined with the base 10 to move along a first axial direction L1 with respect to the base 10. The moving element 20 comprises a blocking portion 21 and at least one connecting portion 22. In one embodiment of the present disclosure, the blocking portion 21 can be a frame structure for limiting the movement of the magnetic element 40. The at least one connecting portion 22 also goes through the second housing 12 to protrude out of the recess 121 to fix the main device combined with the base 10. Each connecting portion 22 can be a hook structure or any other suitable structure for connection.

Furthermore, the moving element 20 further comprises a second through hole 23 and a second fixing portion 24. The position of the second through hole 23 corresponds to the position of the limiting portion 132 of the holder 13, thereby allowing the limiting portion 132 and the magnetic element 40 to go through the second through hole 23. The second fixing portion 24 goes through the first through hole 135 of the holder 13 and fixes the elastic element 30. When the moving element 20 moves, the second fixing portion 24 can move along the first through hole 135. The second fixing portion 24 can be a hook structure.

The elastic element 30 drives the moving element 20 to return its original position after the moving element 20 moves along a first axial direction L1 with respect to the base 10. The elastic element 30 comprises a first end 31 and a second end 32; the first end 31 is connected to the first fixing portion 131 of the holder 13, and the second end 32 is connected to the second fixing portion 24 of the moving element 20.

The magnetic element 40 is movably combined with the base 10 to move with respect to the base 10 along a second axial direction L2 substantially perpendicular to the first axial direction L1. In one embodiment of the present disclosure, the magnetic element 40 is disposed in the limiting portion 132 of the holder 13, and the magnetic element 40 is fixed in the limiting portion 132 by the magnetic attraction force generated between the magnetic element 40 and the auxiliary magnetic element 134. The magnetic element 40 can be an independent magnet.

Furthermore, the expanding platform 1 further comprises an operating element 50. The operating element 50 is movably combined with the base 10, so the operating element 50 is driven by an external force to drive the moving element 20.

In one embodiment of the present disclosure, the operating element 50 can be a button element moving along the second axial direction L2. In order to work with the button element, the moving element 20 further comprises a incline structure 25, which is disposed at a position corresponding to that of the operating element 50, thereby allowing the moving element 20 to move with the operating element 50 when the operating element 50 is operated. The button element can also work with a spring element, so the button element can be returned to its original position by the elastic force of the spring element after the button element is pressed to drive the moving element 20. However, there are many possible configurations for the operating element 50; for example, the operating element 50 can be an actuating element moving along the first axial direction L1 and directly connecting to the moving element 20. Therefore, when the operating element 50 is operated, it can drive the moving element 20 to move therewith.

Figure 3:
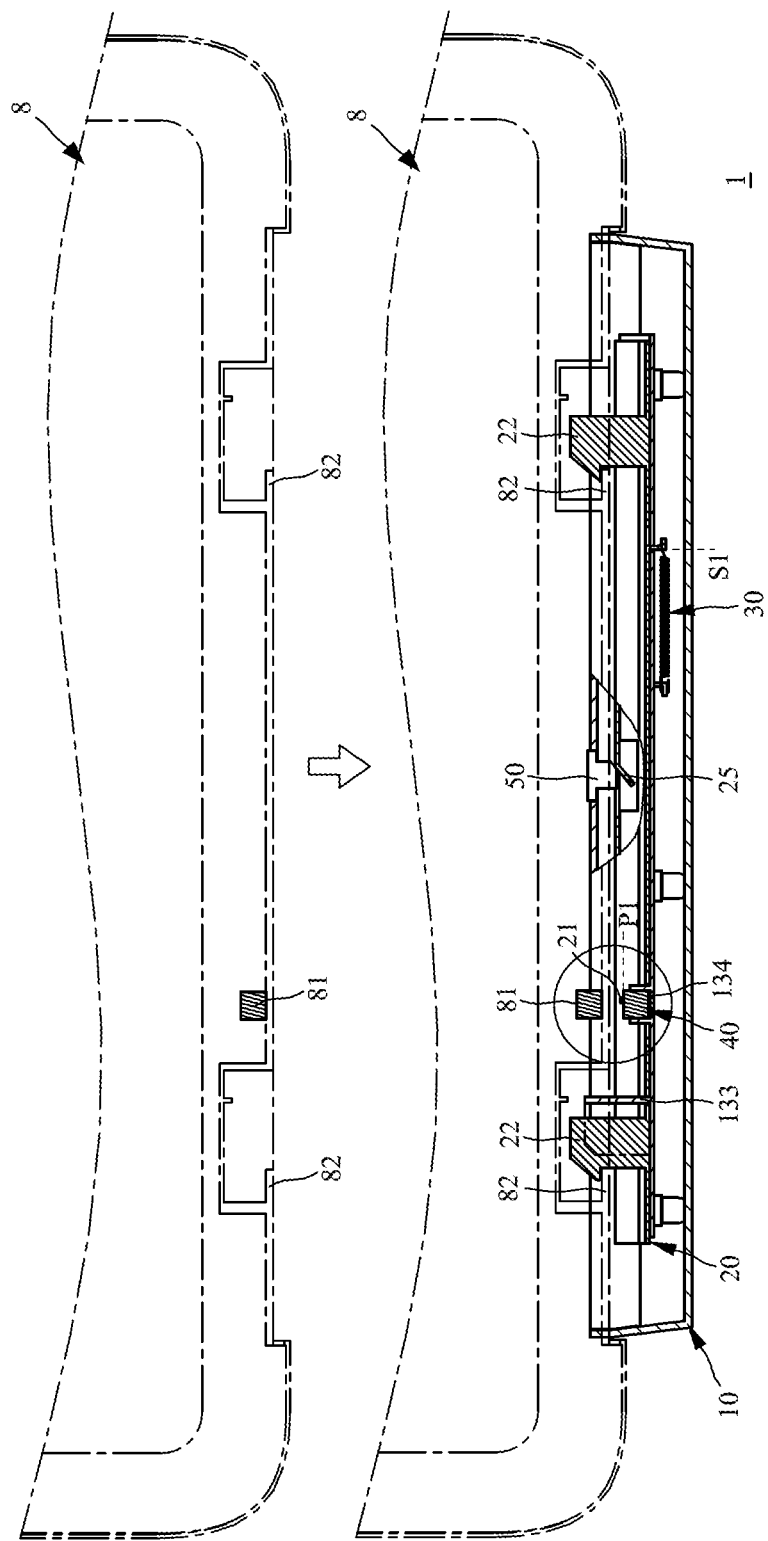
FIG. 3 illustrates a view of the expanding platform combining with the main device in the present disclosure.

FIG. 3 illustrates a view of the expanding platform 1 combining with the main device 8 in the present disclosure. As shown in FIG. 3, in order to let the user use only one hand to separate the main device 8 and the expanding platform 1, the main device 8 comprises a corresponding magnetic element 81, and the corresponding magnetic element 81 is disposed at a position corresponding to that of the magnetic element 40 of the expanding platform 1. In designs disclosure, a magnetic attraction force generated between the auxiliary magnetic element 134 and the magnetic element 40 is smaller than a magnetic attraction force generated between the corresponding magnetic element 81 and the magnetic element 40. The corresponding magnetic element 81 can be a magnet, a metal element attracted to magnet, or a metal housing of the main device.

Furthermore, the main device 8 further comprises at least one corresponding connecting portion 82. Each corresponding connecting portion 82 corresponds to each connecting portion 22 of the moving element 20 in the structure, and each corresponding connecting portion 82 is disposed at a position corresponding to that of each connecting portion 22 as well. For example, in one embodiment of the present disclosure, each corresponding connecting portion 82 can be a slot corresponding to each hook-like connecting portion 22; however, each corresponding connecting portion 82 can have any other suitable shapes. It is noted that the main device 8 is shown in dotted lines in the following figures so as to clearly illustrate the structures and operations of the moving element 20 and the magnetic element 40.

To combine the expanding platform 1 and the main device 8, the user can hold the main device 8 with only one hand and insert it into the recess (not shown in figure) of the base 10. After the main device 8 is combined with the expanding platform 1, each connecting portion 22 of the moving element 20 would be locked with each corresponding connecting portion 82 respectively to fix the main device 8 with the expanding platform 1. At this time the moving element 20 is at the initial position S1, and the magnetic element 40 is at the first position P1. Although the corresponding magnetic element 81 has already generated magnetic attraction force with the magnetic element 40, the magnetic element 40 is still blocked by the blocking portion 21 of the moving element 20 to stay at the first position P1.

Figure 4:
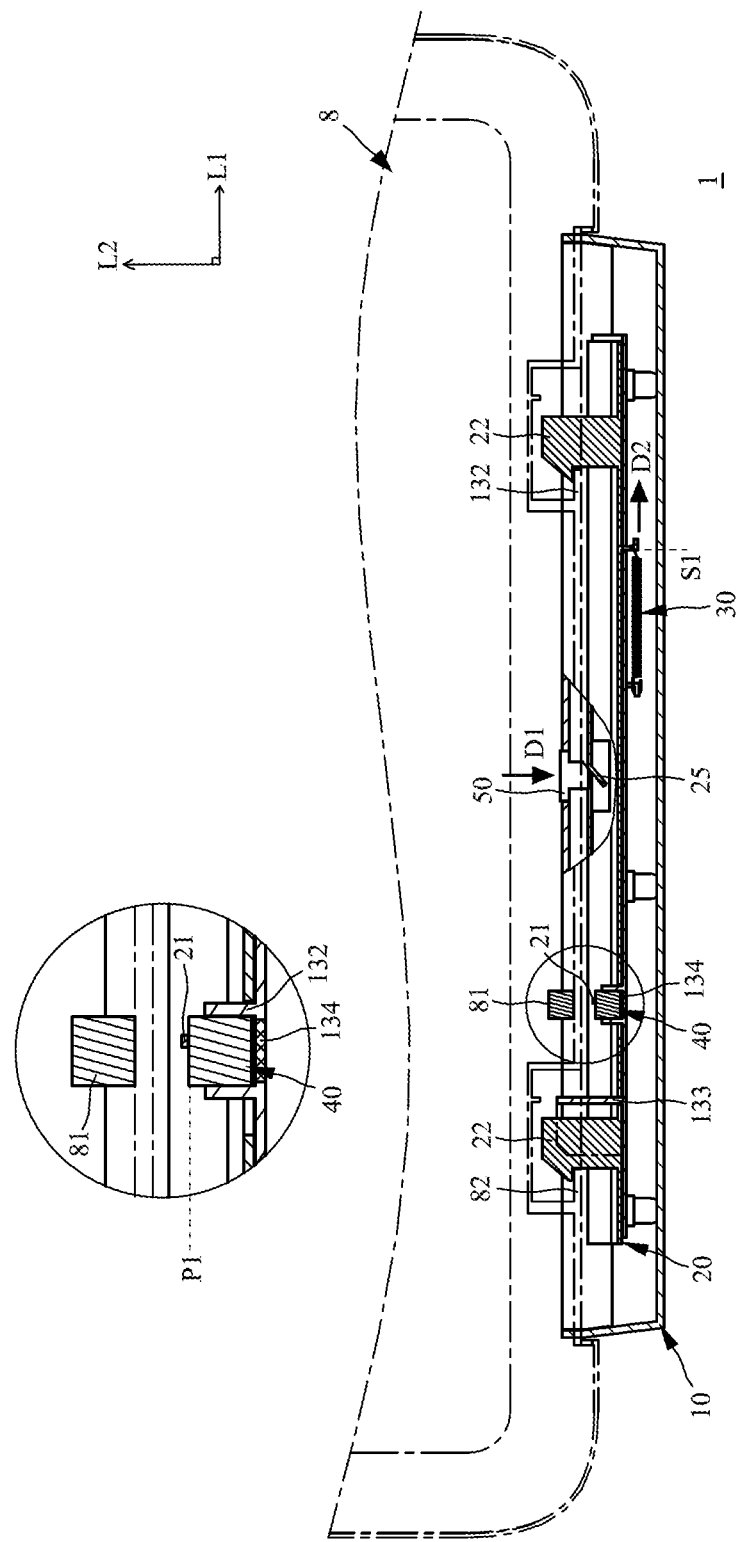
FIG. 4 illustrates a view of the expanding platform before operating the operating element.
Figure 5:
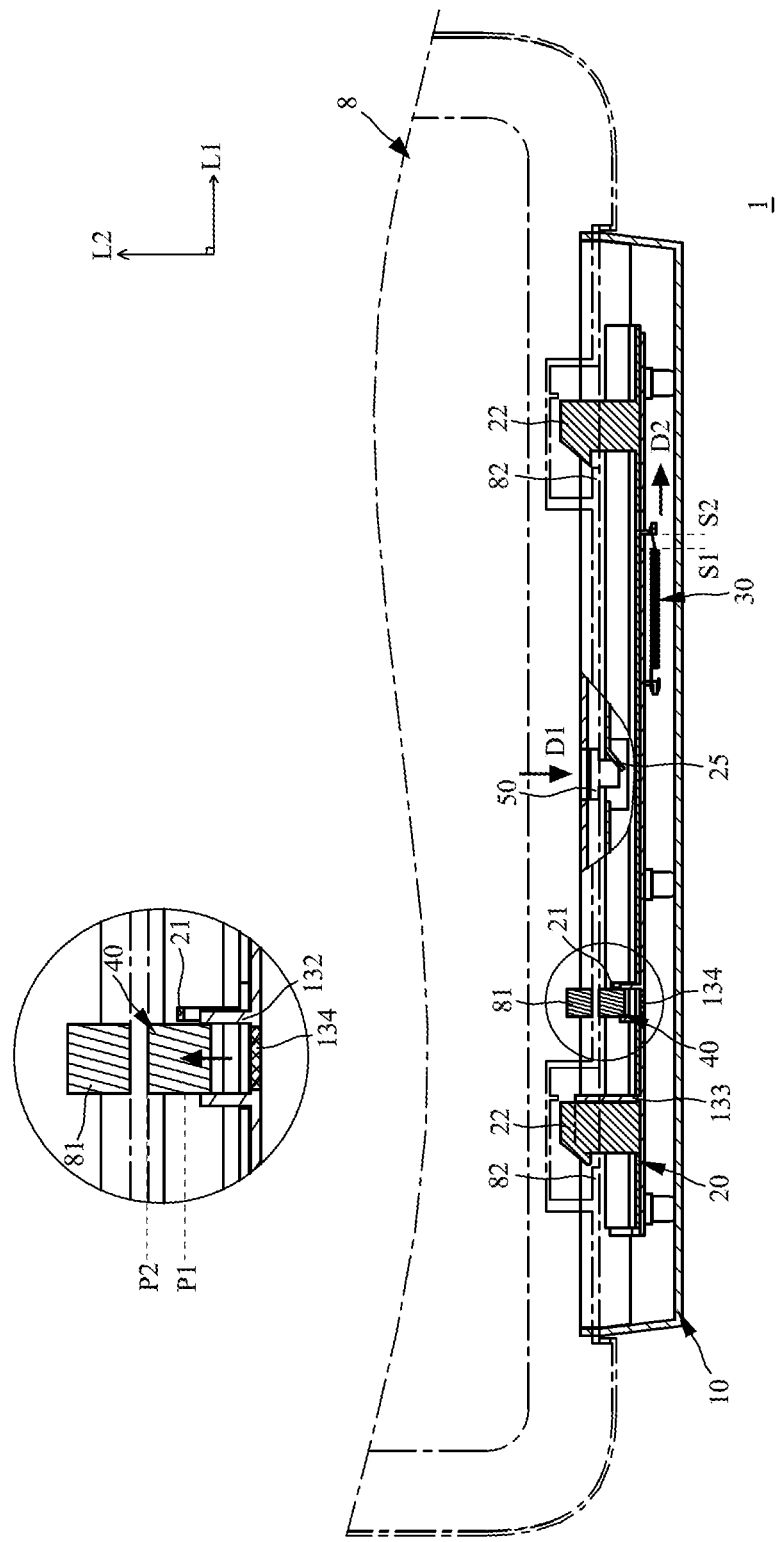
FIG. 5 illustrates a view of the expanding platform after operating the operating element.

Please refer both FIG. 4 and FIG. 5. FIG. 4 illustrates a view of the expanding platform before operating the operating element; FIG. 5 illustrates a view of the expanding platform after operating the operating element. As shown in FIG. 4 and FIG. 5, when the user wants to separate the expanding platform 1 and the main device 8 shown in FIG. 4, the user uses one hand to apply a force on the operating element 50 in first. In this embodiment, when the button-like operating element 50 is pressed by a force to move along the second axial direction L2 towards the first direction D1, the operating element 50 gradually makes contact with the incline structure 25 of the moving element 20 and starts to drive the moving element 20 to move along the first axial direction L1 towards the second direction D2; meanwhile, each connecting portion 22 moves with the moving element 20 to gradually disengage from each corresponding connecting portion 82. The moving element 20 would stop moving towards the second direction D2 when the connecting portion 22 of the moving element 20 is blocked by the auxiliary limiting portion 133. At this time, the moving element 20 has moved to the unlocking position S2 shown in FIG. 5, and each connecting portion 22 totally disengages from each corresponding connecting portion 82 respectively. During the movement of the moving element 20, the elastic element 30 also moves with the moving element 20 to be in a stretched state.

Similarly, when the moving element 20 moves from the initial position S1 shown in FIG. 4 to the unlocking position S2 shown in FIG. 5, the blocking portion 21 also moves with the moving element 20. After the moving element 20 has moved to the unlocking position S2, the magnetic element 40 is no longer blocked by the blocking portion 21. Since the magnetic attraction force generated between the auxiliary magnetic element 134 and the magnetic element 40 is smaller than the magnetic attraction force generated between the corresponding magnetic element 81 and the magnetic element 40, the magnetic element 40 is attracted by the corresponding magnetic element 81 to move from the first position P1 to the second position P2.

When the magnetic element 40 moves to the second position P2, the magnetic element 40 is capable of blocking the blocking portion 21; that is, when the corresponding magnetic element 81 of the main device 8 continues to attract the magnetic element 40, the moving element 20 cannot return to the initial position S1 by the elastic restoring force of the elastic element 30. Therefore, after the user applies an external force on the operating element 50 to drive the moving element 20 to move to the unlocking position S2, the moving element 20 is fixed at the unlocking position S2 even the user releases the operating element 50. At this time, the user can easily takes the main device 8 out from the expanding platform 1 with only one hand.

Figure 6:
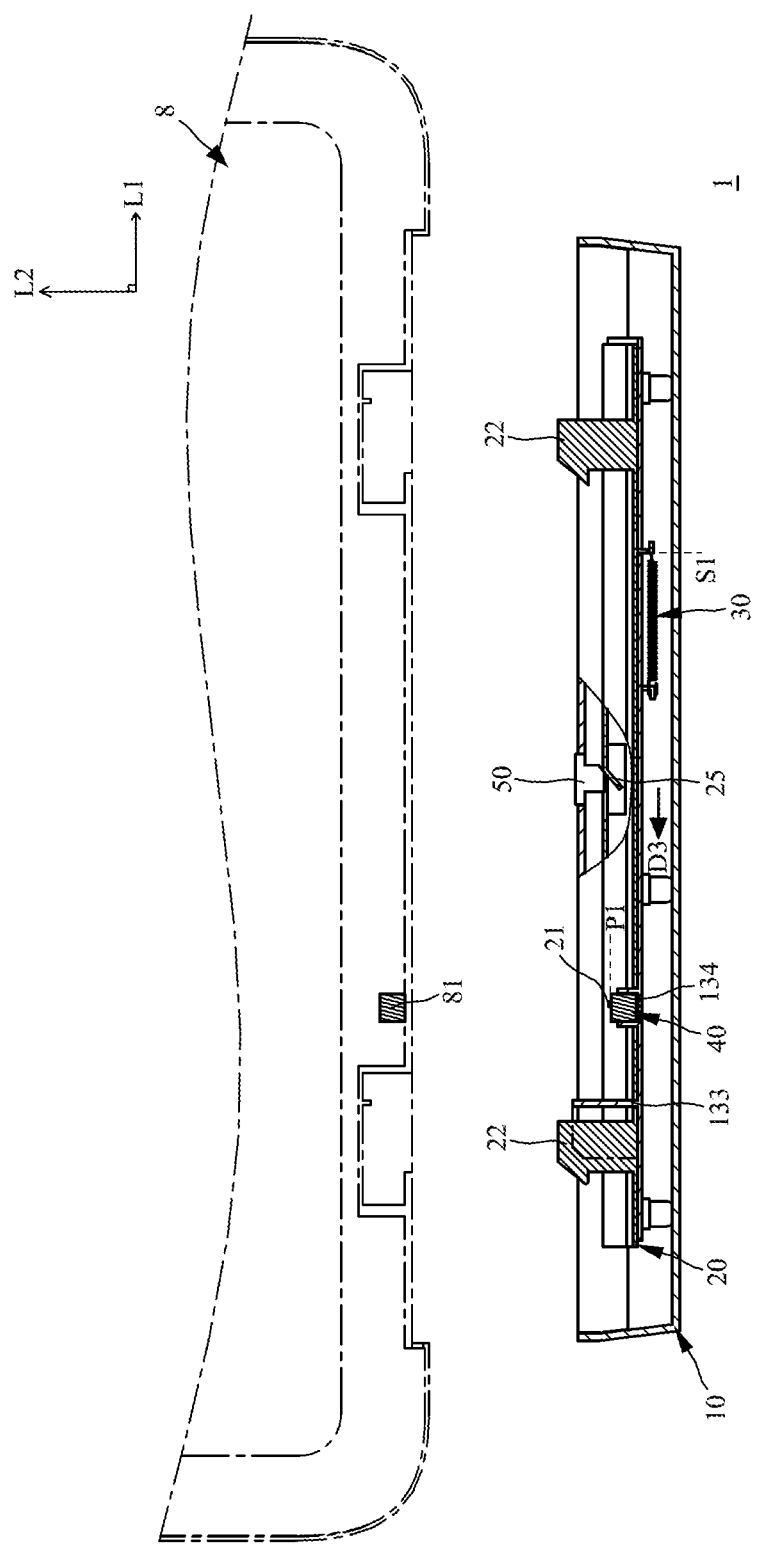
FIG. 6 illustrates a view of the main device disengaging from the expanding platform.

In the following, please refer both FIG. 5 and FIG. 6. FIG. 6 illustrates a view of the main device disengaging from the expanding platform. As shown in FIG. 6, when the user takes the main device 8 out from the expanding platform 1, the magnetic attraction force between the corresponding magnetic element 81 and the magnetic element 40 gradually disappears since the main device 8 is already away from the expanding platform 1. Therefore, the magnetic element 40 is attracted by gravity and/or the magnetic attraction force from the auxiliary magnetic element 134 to return to the first position P1. In the meantime, since the blocking portion 21 of the moving element 20 is not blocked by the magnetic element 40, the moving element 20 is driven by the elastic restoring force of the elastic element 30 to move along the first axial direction L1 towards the third direction D3, and then returns to the initial position S1. The magnetic element 40 is now blocked by the blocking portion 21 again. Therefore, the expanding platform 1 would return to the original state where it is not combined with the main device 8.

Accordingly, the present disclosure provides a design for the user to use only one hand to combine the main device with the expanding platform or to disengaging the main device from the expanding platform, thereby enhancing convenience in using the expanding platform.

It is noted that the above-mentioned embodiments are only for illustration. It is intended that the present disclosure cover modifications and variations of this disclosure provided they fall within the scope of the following claims and their equivalents. Therefore, it will be apparent to those skilled in the art that various modifications and variations can be made to the structure of the present disclosure without departing from the scope or spirit of the disclosure.

What is claimed is:

1. An expanding platform combined with a main device, the expanding platform comprising:
   a base;
   a moving element movably combined with the base to move between an initial position and an unlocking position along a first axial direction with respect to the base, the moving element comprising a blocking portion;
   an elastic element comprising two ends connected with the base and the moving element respectively; and
   a magnetic element movably combined with the base to move with respect to the base between a first position and a second position along a second axial direction substantially perpendicular to the first axial direction;
   wherein the moving element at the initial position limits the magnetic element to the first position by the blocking portion; when the moving element moves to the unlocking position, the magnetic element disengages from the blocking portion and is attracted to move to the second position by a corresponding magnetic element of the main device combined with the base, so that the moving element is fixed at the unlocking position by the magnetic element blocking the blocking portion; after the magnetic element returns to the first position, the moving element returns to the initial position by an elastic force of the elastic element.

2. The expanding platform as claimed in claim 1, wherein the moving element further comprises at least one connecting portion for fixing the main device, and each connecting portion protrudes out of a recess of the base.

3. The expanding platform as claimed in claim 2, wherein the base comprises at least one auxiliary limiting portion for limiting a moving distance of the at least one connecting portion of the moving element, and each auxiliary limiting portion is protrudingly disposed in the recess.

4. The expanding platform as claimed in claim 2, wherein the base further comprises a limiting portion for keeping the magnetic element moving along the second axial direction.

5. The expanding platform as claimed in claim 4, wherein the base further comprises an auxiliary magnetic element, and the auxiliary magnetic element is disposed at the limiting portion to assist the magnetic element in returning to the first position.

6. The expanding platform as claimed in claim 5, wherein a magnetic attraction force generated between the auxiliary magnetic element and the magnetic element is smaller than a magnetic attraction force generated between the corresponding magnetic element and the magnetic element.

7. The expanding platform as claimed in claim 4, wherein the moving element further comprising a through hole for the magnetic element and the limiting portion to go therethrough.

8. The expanding platform as claimed in claim 7 further comprising an operating element movably combined with the base, wherein the operating element is operated by an external force to drive the moving element to move from the initial position to the unlocking position.

9. The expanding platform as claimed in claim 8, wherein the moving element further comprising an incline structure disposed with respect to the operating element, wherein the incline structure is pushed by the operating element to drive the moving element to move from the initial position to the unlocking position.

10. The expanding platform as claimed in claim 1, wherein the base further comprises a limiting portion for keeping the magnetic element moving along the second axial direction.

11. The expanding platform as claimed in claim 10, wherein the base further comprises an auxiliary magnetic element, and the auxiliary magnetic element is disposed at the limiting portion to assist the magnetic element in returning to the first position.

12. The expanding platform as claimed in claim 11, wherein a magnetic attraction force generated between the auxiliary magnetic element and the magnetic element is smaller than a magnetic attraction force generated between the corresponding magnetic element and the magnetic element.

13. The expanding platform as claimed in claim 10, wherein the moving element further comprising a through hole for the magnetic element and the limiting portion to go therethrough.

14. The expanding platform as claimed in claim 13 further comprising an operating element movably combined with the base, wherein the operating element is operated by an external force to drive the moving element to move from the initial position to the unlocking position.

15. The expanding platform as claimed in claim 14, wherein the moving element further comprising an incline structure disposed with respect to the operating element, wherein the incline structure is pushed by the operating element to drive the moving element to move from the initial position to the unlocking position.

16. The expanding platform as claimed in claim 2 further comprising an operating element movably combined with the base, wherein the operating element is operated by an external force to drive the moving element to move from the initial position to the unlocking position.

17. The expanding platform as claimed in claim 16, wherein the moving element further comprising an incline structure disposed with respect to the operating element, wherein the incline structure is pushed by the operating element to drive the moving element to move from the initial position to the unlocking position.

18. The expanding platform as claimed in claim 1 further comprising an operating element movably combined with the base, wherein the operating element is operated by an external force to drive the moving element to move from the initial position to the unlocking position.

19. The expanding platform as claimed in claim 18, wherein the moving element further comprising an incline structure disposed with respect to the operating element, wherein the incline structure is pushed by the operating element to drive the moving element to move from the initial position to the unlocking position.

20. A portable electronic apparatus comprising:
an expanding platform as claimed in claim 1; and
a main device detachably combined with the expanding platform, the main device comprising a corresponding magnetic element disposed with respect to the magnetic element; wherein when the main device is combined with the expanding platform, the corresponding magnetic element generates a magnetic effect with the magnetic element.

21. The portable electronic apparatus as claimed in claim 20, wherein the magnetic element can be a magnet, and the corresponding magnetic element can be a magnet, a metal element attracted to magnet, or a metal housing of the main device.

* * * * *